United States Patent
Mobley

(10) Patent No.: US 6,971,755 B1
(45) Date of Patent: Dec. 6, 2005

(54) ADJUSTABLE SIDE-MOUNTED REAR VIEW MIRROR

(76) Inventor: Stacey L. Mobley, 9668 Rudolph Rd., Rudolph, OH (US) 43462

( * ) Notice: Subject to any disclaimer, the term of this patent is extended or adjusted under 35 U.S.C. 154(b) by 81 days.

(21) Appl. No.: 10/764,047

(22) Filed: Jan. 26, 2004

(51) Int. Cl.$^7$ .......................... G02B 7/182; B60R 1/06
(52) U.S. Cl. .................. 359/843; 359/872; 359/877
(58) Field of Search .................. 359/604, 605, 359/606, 843, 872, 877

(56) References Cited

U.S. PATENT DOCUMENTS

| | | | |
|---|---|---|---|
| 2,466,625 A | | 4/1949 | Ulmer |
| 3,522,583 A | * | 8/1970 | Russell ...................... 359/843 |
| 3,574,446 A | * | 4/1971 | Moore ......................... 359/608 |
| 3,664,729 A | * | 5/1972 | Moore ......................... 359/606 |
| 4,167,306 A | * | 9/1979 | Longland .................... 359/876 |
| 4,171,875 A | * | 10/1979 | Taylor et al. ............... 359/877 |
| 4,179,594 A | * | 12/1979 | Coyle et al. ................. 200/310 |
| 4,318,590 A | * | 3/1982 | Hanley ........................ 359/214 |
| 4,331,382 A | | 5/1982 | Graff |
| 4,560,251 A | | 12/1985 | Mürjahn |
| 4,577,929 A | | 3/1986 | Guillen |
| 4,865,421 A | | 9/1989 | Lu et al. |
| 4,906,089 A | * | 3/1990 | Biondi et al. ............... 359/843 |
| 5,097,362 A | * | 3/1992 | Lynas ......................... 359/843 |
| 5,126,885 A | * | 6/1992 | Gray .......................... 359/841 |
| 5,189,561 A | * | 2/1993 | Hong .......................... 359/843 |
| D353,125 S | | 12/1994 | Mingledorff |
| 5,450,246 A | * | 9/1995 | Jain ........................... 359/877 |
| 5,953,167 A | * | 9/1999 | Valentino .................... 359/843 |

\* cited by examiner

Primary Examiner—Ricky D. Shafer
(74) Attorney, Agent, or Firm—Donald R. Schoonover

(57) ABSTRACT

A rear view mirror that is mounted on the side of a land vehicle includes a mirror pivotally mounted on a housing and a solenoid-actuated ram connected to the mirror. The solenoid is controlled by a control button located inside the land vehicle to change the orientation of the mirror. A light located adjacent to the activating button reminds a driver that the orientation of the side mounted mirror has been changed.

1 Claim, 1 Drawing Sheet

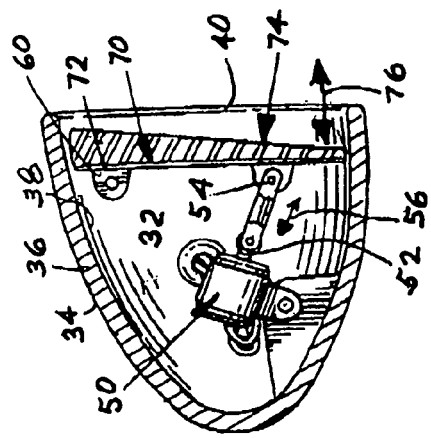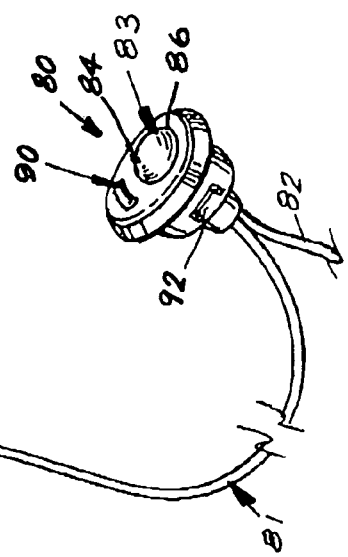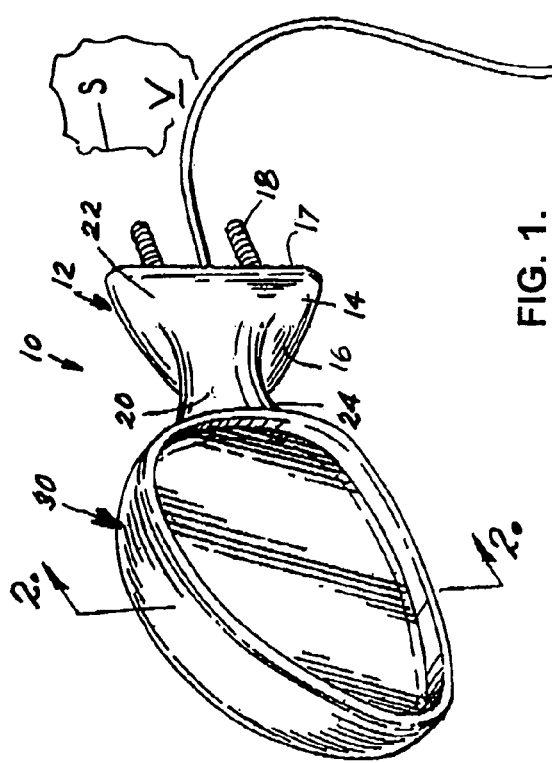
FIG. 2.
FIG. 1.

ADJUSTABLE SIDE-MOUNTED REAR VIEW MIRROR

BACKGROUND OF THE INVENTION

1. Field of the Invention

The present invention relates to the general art of land vehicles, and to the particular field of side view mirrors for land vehicles.

2. Discussion of the Related Art

Mirrors are essential accessories for nearly any type of land vehicle, especially an automobile. Mirrors allow a driver to see obstacles and other vehicles on all sides of the driver's vehicle. To this end, the art containing mirrors for land vehicles has greatly expanded in recent years, and now contains many examples of such mirrors.

The most common type of rear view mirror is a mirror located inside the driver's compartment and which is directed to reflect objects located behind the driven vehicle. Another common type of mirror is a mirror mounted on the side of the driven vehicle and which is oriented to reflect objects located beside the driven vehicle.

These mirrors are all extremely helpful and are invaluable safety features for nearly all land vehicles.

However, because these mirrors are oriented so they can be easily seen by a driver, any light from an object or a vehicle in the field of the mirror will be reflected to the driver as he or she looks at the mirror. This can be annoying at best, and dangerous at worst.

Accordingly, many mirrors that are located inside a motor vehicle are adjustable so a driver can quickly move the mirror to an orientation that directs such light away from his or her eyes. Some interior mirrors also have special electrical circuits that are intended to reduce the effect of such unwanted light reflection.

However, the inventor has observed that similar problems exist with the mirrors located outside the motor vehicle. That is, light from a following or passing vehicle is reflected into a driver's eyes from the side mounted mirrors. Such light can also be annoying and/or dangerous.

Therefore, there is a need for a side view mirror that can be adjusted to prevent lights from a vehicle located beside a land vehicle from being reflected into a driver's eyes.

Many drivers are so intent upon the task of driving that they forget certain operations. One of the most evident of such operations is the turn signal. A car with a continuously flashing turn signal and which is not turning is a common example of this problem. This problem may also occur if a driver has re-oriented a mirror. The driver may forget to re-orient the mirror back to its original position. Thus, if a driver has moved a side view mirror to prevent light from being reflected back into his or her eyes, that driver may forget to return the mirror back to its original orientation. In such a case, the driver may be deprived of use of the side view mirror when he or she needs to view the side of his or her vehicle. This situation is at least as bad as not having a side view mirror, and may be worse since the driver may be depending on the side view mirror.

Therefore, there is a need for a side view mirror that can be adjusted to prevent lights from a vehicle located beside a land vehicle from being reflected into a driver's eyes and which will alert the driver that the mirror has been moved.

If a mirror has been moved or adjusted, it should be easy to move the mirror back to its original orientation. Otherwise, a driver may be distracted while he or she is re-adjusting his or her mirror or mirrors. This may require the driver to pull off the road, which is not a desirable situation.

Therefore, there is a need for a side view mirror that can be adjusted to prevent lights from a vehicle located beside a land vehicle from being reflected into a driver's eyes and which will alert the driver that the mirror has been moved and which can be easily moved back to its original position.

To be most effective, any such accessory should be usable on both new and old vehicles. Of course, the accessory could be placed on the vehicle during manufacture; however, to be most commercially acceptable, such an accessory should be easily retrofit onto existing vehicles.

Therefore, there is a need for a side view mirror that can be adjusted to prevent lights from a vehicle located beside a land vehicle from being reflected into a driver's eyes and which will alert the driver that the mirror has been moved and which can be easily moved back to its original position and which can be easily retrofit onto an existing land vehicle.

PRINCIPAL OBJECTS OF THE INVENTION

It is a main object of the present invention to provide a side view mirror that can be adjusted to prevent lights from a vehicle located beside a land vehicle from being reflected into a driver's eyes.

It is another object of the present invention to provide a side view mirror that can be adjusted to prevent lights from a vehicle located beside a land vehicle from being reflected into a driver's eyes and which will alert the driver that the mirror has been moved.

It is another object of the present invention to provide a side view mirror that can be adjusted to prevent lights from a vehicle located beside a land vehicle from being reflected into a driver's eyes and which will alert the driver that the mirror has been moved and which can be easily moved back to its original position.

It is another object of the present invention to provide a side view mirror that can be adjusted to prevent lights from a vehicle located beside a land vehicle from being reflected into a driver's eyes and which will alert the driver that the mirror has been moved and which can be easily moved back to its original position and which can be easily retrofit onto an existing land vehicle.

SUMMARY OF THE INVENTION

These, and other, objects are achieved by a side view mirror assembly that includes a housing that is mounted on the outside of a land vehicle on a driver's side when in use. The side view mirror assembly has a mirror pivotally mounted in the housing and the mirror is attached to a solenoid operated ram located inside the housing for the mirror. The solenoid operating the ram is electrically connected to a control button located inside the vehicle. A light is located adjacent to the operating button and is also connected to the solenoid and is activated when the solenoid is activated.

Using the side view mirror assembly embodying the present invention will permit a driver of a land vehicle to move the side view mirror so lights from any vehicle located adjacent to the driver's vehicle will be directed away from the driver rather than into the driver's eyes. The light next to the control button is activated when the mirror is moved and remains on until the mirror is moved back into its original position so the driver is reminded to move the side view mirror back. The mirror assembly of the present invention is self-contained so it is easily retrofit onto an existing vehicle.

BRIEF DESCRIPTION OF THE DRAWING FIGURES

FIG. 1 is a perspective view of a mirror assembly embodying the present invention.

FIG. 2 is an elevational view taken along line 2—2 of FIG. 1.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in an adjustable side mounted rear view mirror 10 which can be adjusted from inside a vehicle to prevent lights from an adjacent vehicle from being directed back to a driver's eyes.

Mirror 10 comprises a one piece housing unit 12 which is adapted to be mounted on an outside side surface S of a land vehicle V such as an automobile. Housing unit 12 is one piece and can be formed of plastic or other material used for land vehicle accessories, such as mirrors and other attachable elements. Housing unit 12 includes a base 14. Base 14 includes a first surface 16 which is an outer surface when the base 14 is in a use position on the outside side surface of the land vehicle, such as indicated in FIG. 1. The base 14 further includes a second surface 17 which is an inside surface when the base 14 is in the use position on the outside side surface of the land vehicle.

Anchor elements, such as mounting screw 18, are mounted in the base. The anchor elements extend outwardly from the second surface 17 of the base 14 and are adapted to anchor the base 14 to the outside side surface of the land vehicle.

A pedestal 20 has a proximal end 22 that is unitary and one piece with the base 14. The pedestal 20 extends outwardly away from the first surface 16 of the base 14 and further includes a distal end 24 that is spaced apart from the proximal end 22 of the pedestal 20.

A hollow housing 30 is unitary and one piece with the distal end 24 of the pedestal 20. Housing 30 includes an inside area 32 and an outside area 34. Housing 30 further includes a first surface 36 that is an outer surface when the housing 30 is in place on the outside side surface of the land vehicle and a second surface 38 that is an inner surface when the housing 30 is in place on the outside side surface of the land vehicle. An opening 40 is defined in the hollow housing 30.

A solenoid element 50 is mounted on the second surface 38 of the hollow housing 30 at a location spaced apart from the opening 40 defined in the hollow housing 30. Solenoid element 50 includes a ram 52 which extends away from the solenoid element 50 and has a distal end 54 that is located near the opening 40 defined in the hollow housing 30. Ram 54 is movable toward and away from the solenoid element 50 as indicated by double-headed arrow 56 under control of the solenoid element 50.

A pivot connection 60 is located on the second surface 38 of the hollow housing 30 near the opening 40 defined in the hollow housing 30.

A mirror 70 has a first end 72 pendently supported on the pivot connection 60 and a second end 74 that is spaced apart from the pivot connection 60 to move toward the inside of the hollow housing 30 and toward the outside of the hollow housing 30 as indicated in FIG. 2 by double-headed arrow 76. Mirror 70 is located to cover opening 40 defined in the hollow housing 30. Distal end 54 of ram 52 of the solenoid element 50 is connected to the mirror 70 at a location spaced apart from the pivot connection 60 to move the second end 74 of the mirror 70 in the directions indicated by the arrow 76 toward the inside of the hollow housing 30 and toward the outside of the hollow housing 30 under the influence of the ram 52 of the solenoid element 50 as the ram 52 of the solenoid element 50 moves in directions 56 toward the solenoid unit 50 and away from the solenoid unit 50.

A control button unit 80 is adapted to be located inside the land vehicle when the control button 80 is in the use position and is electrically connected to the solenoid element 50 by a lead line 81 and is electrically connected to a power source on the vehicle, such as the electrical system of the vehicle via a lead line 82 to be electrically interposed between the vehicle power source and the solenoid element 50 in the manner of an electrical switch as will be understood by those skilled in the art based on the teaching of this disclosure. Control button unit 80 electrically connects the solenoid element 50 to the power source when the control button unit 80 is activated. The control button unit 80 has a control button 83 which is movable and which has a first position 84 in which the solenoid element 50 is activated to move the ram 52 of the solenoid element 50 toward the solenoid element 50 and a second position 86 in which the solenoid element 50 is activated to move the ram 52 of the solenoid element 50 away from the solenoid element 50.

A light 90 is electrically connected to control button 83 to be activated when the control button 83 is moved from the first position 84 of the control button 83 to the second position 86 of the control button 83, or from the second position 86 of the control button 83 to the first position 84 of the control button 83. Light 90 includes a switch 92 that de-activates the light 90 when the control button 83 is moved back to the first position 84 of the control button 83 from the second position 86 of the control button 83 after being moved from the first position 84 to the second position 86 or the control button 83 is moved back to the second position 86 from the first position 84 after the control button 83 is moved from the second position 86 to the first position 84. Switch 92 can include a switch circuit that is similar to those associated with illuminated push buttons, such as disclosed in U.S. Pat. No. 4,179,594, the disclosure of which is incorporated herein by reference. Furthermore, one skilled in the art of logic circuits and switches will be able to design a switch and its associated circuit based on the teaching of the present disclosure. Also, the exact details of the switch circuit are not considered part of the invention. Therefore, no further details of the switch will be presented.

It is understood that while certain forms of the present invention have been illustrated and described herein, it is not to be limited to the specific forms or arrangements of parts described and shown.

What is claimed is:

1. An adjustable side mounted rear view mirror comprising:
   a) a one piece housing unit which is adapted to be mounted on an outside side surface of a land vehicle and which includes
      (1) a base, the base including a first surface which is an outer surface when the base is in a use position on the outside side surface of the land vehicle and a second surface which is an inside surface when the base is in the use position on the outside side surface of the land vehicle, (2) anchor elements in the base, the anchor elements extending outwardly from the second surface of the base and being adapted to anchor the base to the outside side surface of the land vehicle, (3) a pedestal having a proximal end unitary and one piece with the base, the pedestal extending outwardly away from the first surface of the base and further including a distal end that is spaced apart from the proximal end of the pedestal, and (4) a hollow housing which is unitary and one piece with the distal end of the pedestal and which includes
   (A) an inside area and an outside area,
   (B) a first surface that is an outer surface when the housing is in place on the outside side surface of the land vehicle,
   (C) a second surface that is an inner surface when the housing is in place on the outside side surface of the land vehicle, and
   (D) an opening defined in the hollow housing;

b) a solenoid element mounted on the second surface of the hollow housing at a location spaced apart from the opening defined in the hollow housing, said solenoid element including a ram extending away from said solenoid and having a distal end located near the opening defined in the hollow housing, the ram being movable toward and away from said solenoid element under control of said solenoid element;

c) a pivot connection on the second surface of the hollow housing near the opening defined in the hollow housing;

d) a mirror having a first end pendently supported on said pivot and a second end spaced apart from said pivot connection to move toward the inside of the hollow housing and toward the outside of the hollow housing, said mirror being located to cover the opening defined in the hollow housing, the distal end of the ram of said solenoid element being connected to said mirror at a location spaced apart from the pivot connection to move the second end of said mirror toward the inside of said hollow housing and toward the outside of said hollow housing under the influence of the ram of said solenoid element as the ram of said solenoid element moves toward said solenoid unit and away from said solenoid unit;

e) a control button unit that is adapted to be located inside the land vehicle when the control button is in a use position, said control button unit being electrically interposed between a power source of the land vehicle and said solenoid element and electrically connecting said solenoid element to the power source when activated, said control button having a control button which is movable and which has a first position in which said solenoid element is activated to move the ram of said solenoid element toward said solenoid element and a second position in which said solenoid element is activated to move the ram of said solenoid element away from said solenoid element; and f) a light electrically connected to said control button to be activated when said control button is moved from the first position of said control button to the second position of the control button, or from the second position of the control button to the first position of the control button, said light including a switch that de-activates said light when the control button is moved back to the first position of the control button from the second position of the control button after being moved from the first position to the second position or the control button is moved back to the second position from the first position after the control button is moved from the second position to the first position.

* * * * *